United States Patent [19]

Shima et al.

[11] 4,171,505
[45] Oct. 16, 1979

[54] FAULT DETECTING SYSTEM FOR A CONTROL SYSTEM

[75] Inventors: Seiya Shima; Hiroaki Kuroha, both of Katsuta; Ando Takeki, Naka; Hiromi Inaba, Hitachi; Toshiaki Kurosawa, Katsuta; Mutsuhiro Terunuma, Mito; Yoshio Sakai, Naka, all of Japan

[73] Assignee: Hitachi, Ltd., Japan

[21] Appl. No.: 845,062

[22] Filed: Oct. 25, 1977

[30] Foreign Application Priority Data

Oct. 26, 1976 [JP] Japan .................. 51-128619

[51] Int. Cl.$^2$ .............................................. G05B 5/00
[52] U.S. Cl. ................................. 318/316; 318/616; 318/618; 318/327; 361/51; 318/146
[58] Field of Search .................. 318/141–144, 318/146, 158, 327, 328, 316, 396, 397, 615, 616, 618; 361/51; 340/661, 670

[56] References Cited

U.S. PATENT DOCUMENTS

| | | | |
|---|---|---|---|
| 3,004,201 | 10/1961 | Fath | 318/158 |
| 3,019,379 | 1/1962 | Zarleng | 318/158 |
| 3,059,161 | 10/1962 | Bailey et al. | 318/158 |
| 3,732,478 | 4/1973 | MacMullan | 318/618 |
| 3,826,961 | 7/1974 | Hayase et al. | 318/327 |

Primary Examiner—Gene Z. Rubinson
Assistant Examiner—M. K. Mutter
Attorney, Agent, or Firm—Craig and Antonelli

[57] ABSTRACT

In a speed feedback control system wherein a speed command signal and a speed feedback signal are compared and wherein the deviation between these signals is entered into a speed control unit, the speed signal is differentiated to apply speed damping in order to suppress the oscillations of the control system. In this case, while the speed command and the actual speed make a great difference transiently, the speed command is approximate to the sum between the speed feedback signal and the damping signal even transiently. Therefore, the speed command signal is compared with the sum between the speed feedback signal and the damping signal, and the fault of the speed control system is detected upon the fact that the deviation has exceeded a predetermined value.

26 Claims, 7 Drawing Figures

PREDETERMINED VALUE     PREDETERMINED VALUE

FAULT DETECTING SYSTEM FOR A CONTROL SYSTEM

BACKGROUND OF THE INVENTION

This invention relates to a fault detecting system for a control system forming a closed loop, and more particularly to a fault detecting system suitable for the speed control apparatus of an elevator.

In an elevator, any fault in its speed control system is very dangerous because it can cause an abnormal overspeed state to occur. Protective means for preventing an accident resulting in injury even if the overspeed state occurs, is therefore provided. In addition to this, devices are provided for detecting the fault of the speed control system before the occurrence of the overspeed state and preventing the overspeed state from occurring.

A typical construction for controlling the speed of an elevator is essentially that of a basic machine control system for controlling speed of a machine. This basic system compares a speed command signal and a feedback signal representative of the actual speed of the machine, and puts the deviation between these signals into a speed control unit. Even in a case where the controlled variable is not the speed but rather an electric quantity such as voltage and current, many of the controlling systems form a closed loop in which a command signal representative of the desired value of the controlled variable and a feedback signal representative of the actual value of the controlled variable are compared and in which the deviation between the signals is entered into a control unit.

One problem with control system forming a closed loop in this manner is faults which can be caused by an abnormality of a feedback circuit or an abnormality of the control apparatus proper.

Examples of prior systems for detecting such faults are described in the official gazettes of Japanese Patent Application Public-disclosure Nos. 48-58279 and 49-124756, which will now be briefly explained. In general, a feedback signal has a lag attributed to a control unit with respect to a command signal. Therefore, the feedback signal is put into a simulator circuit which includes a leading element of an inverse function to the transfer function of the control unit. The output of the simulator circuit is compared with the command signal. With this measure, when the control system is normal, the output signal and the command signal to be compared exhibit almost no difference, whereas when any fault is involved in the control system, a great difference is made between both the signals. In response to the fact that the difference has exceeded a predetermined value, the fault of the control system is detected.

It is very difficult, however, to fabricate a simulator circuit which accurately simulates the inverse function to the transfer function of the control unit. A great deal of time is required for adjustment, and even with this, a precise adjustment rarely be established.

SUMMARY OF THE INVENTION

An object of this invention is to provide a fault detecting system for a control system which does not require a difficult adjustment and which can detect a fault of the control system reliably and promptly.

This invention is principally characterized by comprising a control unit, means for generating a command signal representative of a desired value of a controlled variable which is to be obtained by said control unit, means for deriving a feedback signal representative of an actual value of the controlled variable as is obtained by said control unit, means for deriving a damping signal representative of a variation in an arbitrary fluctuating element which is associated with the controlled variable, first and second comparator means for comparing the command signal with a sum between the feedback signal and the damping signal, means for entering an output of said first comparator means into said control unit, and fault detecting means adapted to operate in response to the fact that the absolute value of an output of said second comparator means has exceeded a predetermined value.

One example of an area where the present invention finds use is in a speed control system of a D.C. motor for driving an elevator wherein the controlled variable is a speed and wherein the damping signal can be a differentiated signal of the speed or a differentiated signal of a motor current.

BRIEF DESCRIPTION OF THE DRAWINGS

FIGS. 1 to 3 are block diagrams for explaining the principle of this invention, in which FIGS. 1 and 2 illustrate prior art systems and FIG. 3 is a fundamental block diagram of the present invention.

DETAILED DESCRIPTION OF THE INVENTION

Figure 1:
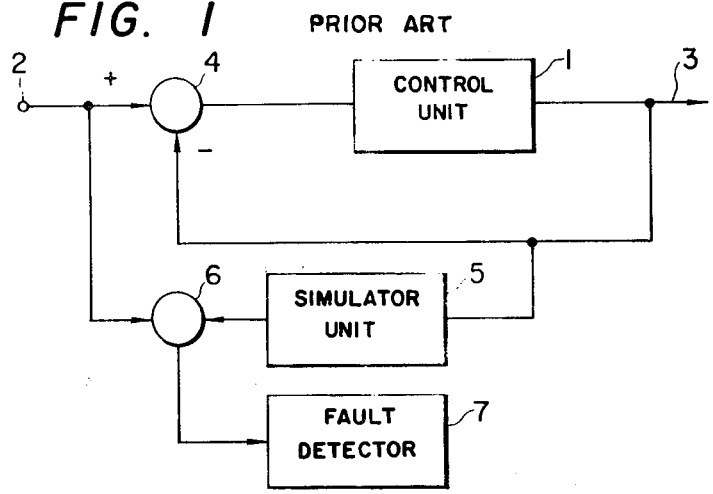

FIG. 1 is a block diagram of a fault detecting system described in the official gazette of Japanese Patent Application Public-disclosure No. 48-58279. A control unit 1 receives a command signal 2 as its input, and provides an output 3. The command signal 2 represents a desired value of a controlled variable, for example, speed. The output 3 represents an actual value of the controlled variable, for example, an actual speed. The output 3 is applied to a comparator 4 as a feedback signal, and the deviation between the command signal 2 and the feedback signal is transmitted to the control unit 1. Thus, a closed loop is formed. Letting G(S) denote the transfer function of the control unit 1, a transfer function W(S) from the command signal 2 to the output 3 is given by the following equation:

$$W(S) = \frac{G(S)}{1 + G(S)} = \frac{1}{1 + \frac{1}{G(S)}} \quad (1)$$

where S denotes a Laplace operator.

When the transfer function G(S) of the control unit 1 is sufficiently large, 1/G(S) is negligible, so that W(S) ≈ 1 and the command signal 2 and the output 3 are substantially coincident. However, when G(S) is not very large and the time constant is large, the output 3 lags over the command signal 2. When, as a typical example, the transfer function G(S) of the control unit 1 is of an element of the first-order lag of the gain K and the time constant T, it is given by:

$$G(S) = \frac{K}{1 + T \cdot S} \quad (2)$$

From Eqs. (1) and (2), the transfer function W(S) from the command signal 2 to the output 3 becomes:

$$W(S) = \frac{1}{1 + K} \cdot \frac{1}{1 + \frac{T}{1 + K} \cdot S} \quad (3)$$

When the gain K is not very large and the time constant T is large, (T/1+K) in Eq. (3) cannot be ignored, and the output 3 lags over the command signal 2 according to the value thereof.

Therefore, a simulator circuit 5 having a transfer function which advances the output 3 is provided, and the command signal 2 and an output of the simulator circuit 5 are compared by means of a comparator 6. With such construction, insofar as the control system is normal, an output of the comparator 6 is extremely small. In contrast, when any fault has occurred in the control system, the output of the comparator 6 becomes great suddenly and capable of operating a fault detecting unit 7.

In case where (T/1+K) in Eq. (3) is comparatively large, the control system is stable. However, in case where the transfer function G(S) of the control unit 1 has time lags of several orders and where the loop gain K is large, oscillations arise in the output 3.

Figure 2:
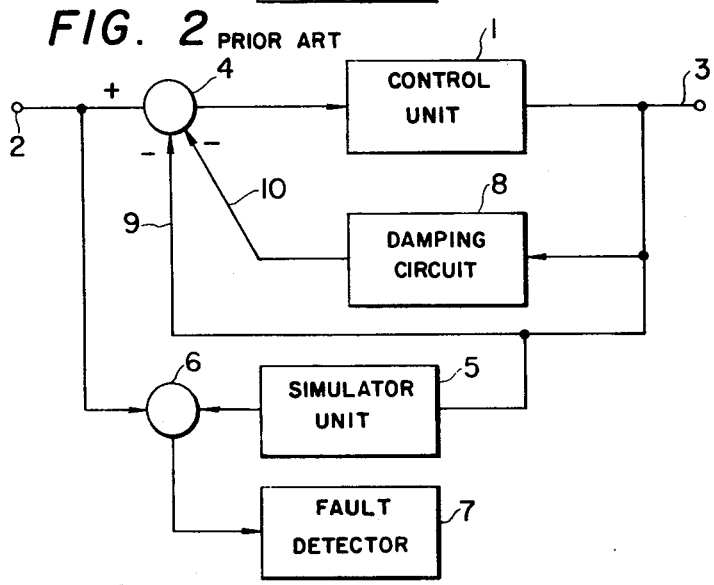

FIG. 2 shows a control system for preventing the oscillations of the output 3. The output 3 is negatively fed back through a damping circuit 8. In this construction, let the transfer function G(S) of the control unit 1 and the transfer function H(S) of the damping circuit 8 be:

$$G(S) = \frac{K_1}{1 + T_1 S + T_2 S^2 + \ldots + T_n S^n} \quad (4)$$

$$H(S) = K_2 S \quad (5)$$

where $K_1$ and $K_2$ denote constants, and $T_1$, $T_2$, ... and $T_n$ denote time lags of the first, second, ... and n-th orders respectively. Then, the transfer function W(S) from the command signal 2 to the output 3 becomes as follows:

$$W(S) = \frac{\frac{K_1}{1 + T_1 S + T_2 S^2 + \ldots + T_n S^n}}{1 + \frac{K_1}{1 + T_1 S + T_2 S^2 + \ldots + T_n S^n} \cdot H(S)} = \frac{K_1}{(1 + T_1 S + T_2 S^2 + \ldots + T_n S^n) + K_1 K_2 S} \quad (6)$$

Accordingly, the response of the transfer function W(S) becomes slow, and the output 3 lags with respect to the command signal 2. The transfer function of the simulator circuit 5 must be an inverse function to the transfer function W(S). It is extremely difficult, however, to accurately produce such function.

The transfer function W(S) from the command signal 2 to the output 3 is represented by the transfer function G(S) of the control unit 1 and the transfer function H(S) of the damping circuit 8, as follows:

$$W(S) = \frac{G(S)}{1 + \{H(S) + 1\} G(S)} = \frac{1}{\frac{1}{G(S)} + H(S) + 1} \quad (7)$$

As previously stated, in the general control systems, G(S) is sufficiently large and hence 1/G(S) is negligible. Therefore, $$W(S) = \frac{1}{1 + H(S)} \quad (8)$$

Thus, a difference develops between the command signal 2 and the output 3 by the component of the transfer function H(S) of the damping circuit 8.

On the other hand, the transfer function J(S) from the command signal 2 to the sum between the feedback signal 9 and the damping signal 10 is obtained by multiplying Eq. (8) by H(S)+1. Therefore, $$J(S) \approx \frac{H(S) + 1}{\frac{1}{G(S)} + H(S) + 1} = 1 \quad (9)$$

It turns out that the command signal $2 \approx$ the feedback signal $9+$ the damping signal 10. That is, the command signal 2 is almost coincident with the sum between the feedback signal 9 and the damping signal 10 both steadily and transiently.

Accordingly, when the command signal 2 is compared with the sum between the feedback signal 9 and the damping signal 10, the fault detection is possible without providing the simulator circuit 5.

Figure 3:
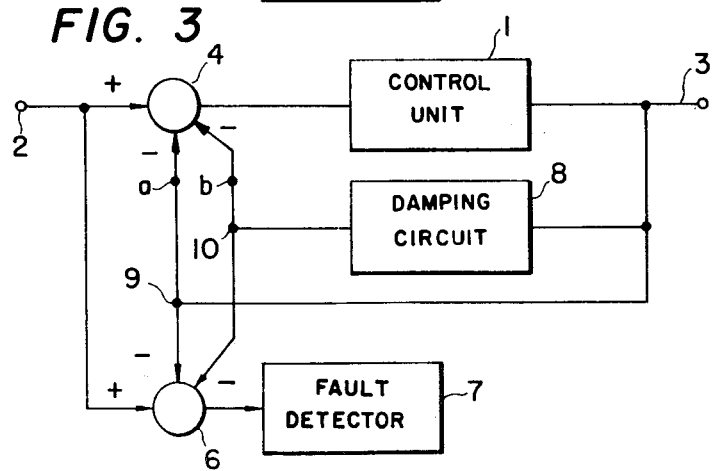

FIG. 3 shows the fundamental block diagram of this invention. Although the construction of the control system is the same as in FIG. 2, the fault detecting system is such that the second comparator 6 carries out the same comparing action as that of the first comparator 4.

That is, this invention comprises a control unit 1, means for generating a command signal 2 representative of a desired value of a controlled variable 3 as is to be obtained by the control unit 1, means for deriving a feedback signal 9 representative of an actual value of the controlled variable 3 as is obtained by the control unit 1, means 8 for deriving a damping signal 10 representative of a variation in an arbitrary fluctuating element (in FIG. 3, the controlled variable 3 itself) which is associated with the controlled variable 3, first and second comparator means 4 and 6 for comparing the command signal 2 with the sum between the feedback signal 9 and the damping signal 10, means for entering an output of the first comparator means 4 into the control unit 1, and fault detecting means 7 adapted to operate in response to the fact that the absolute value of an output of the second comparator means 6 has exceeded a predetermined value.

With such construction, while the control system is normal, the output of the comparator 6 is small. When the control system gets out of order, it is disabled in that the sum between the feedback signal 9 and the damping signal 10 follows up the command signal 2, the output of the comparator 6 exceeds the predetermined value and the fault detecting unit 7 can be actuated.

In practice, it is often the case that, besides the controlled variable (output) itself, the damping signal is taken out from a fluctuating element inside the control unit 1. Under such a situation, it is desirable to enter a plurality of damping signals into the comparator 6 as will be described later. When a compensating signal which is entered into the first comparator 4 is entered into the second comparator 6 in addition to the damping signal, a fault detection of higher precision can be conducted.

Figure 4:
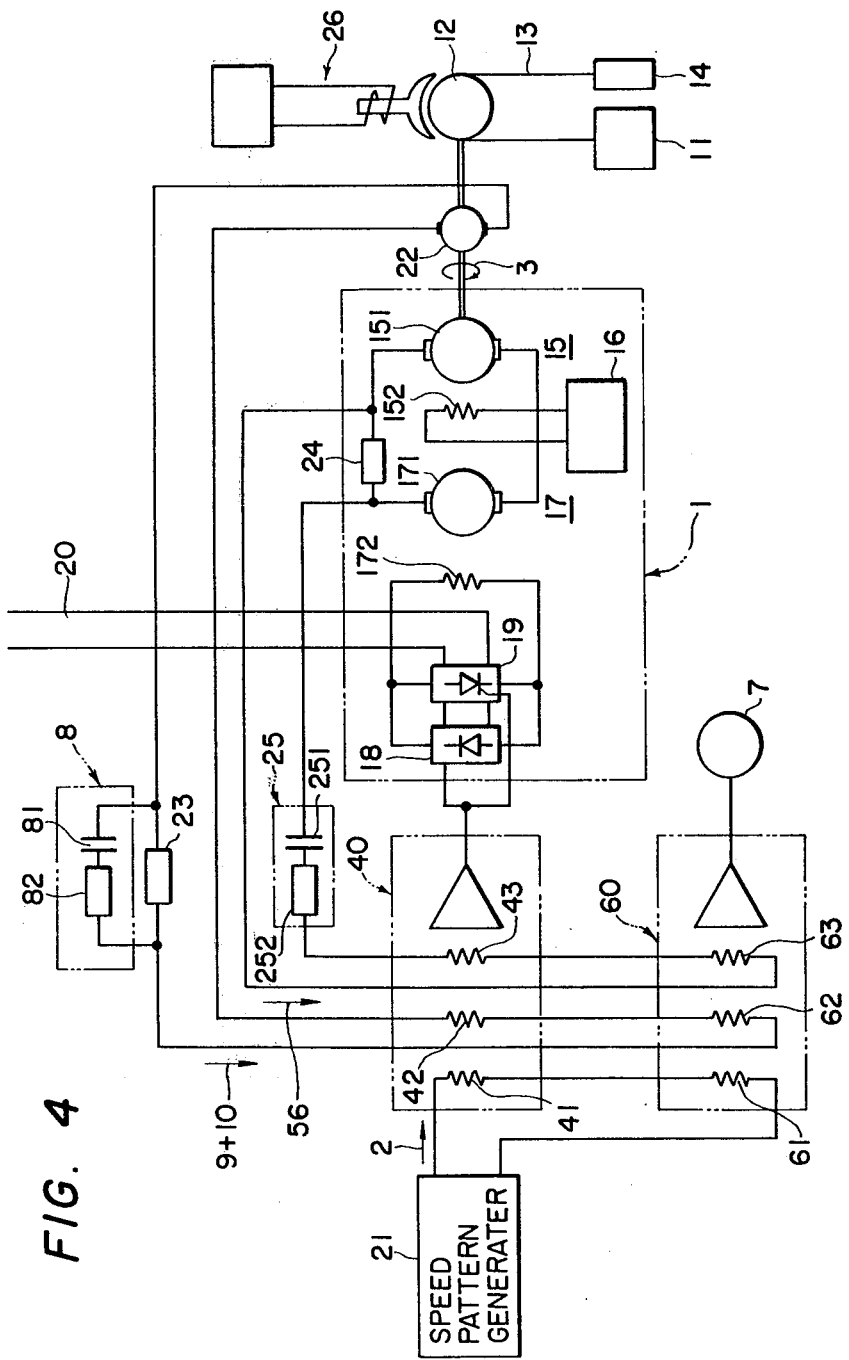
FIG. 4 is an electric circuit diagram of an embodiment in which this invention is applied to an elevator speed control system.

FIG. 4 is an electric circuit diagram of an embodiment wherein this invention is applied to an elevator speed control system.

An elevator car 11 as well as a counterweight 14 is suspended from a sheeve 12 through a rope 13 in a well bucket fashion. The sheeve 12 is coupled with the rotary shaft of a D.C. motor 15 directly or through reduction gears (not shown). The shunt winding 152 of the motor 15 is energized by a constant-current source 16. The armature 151 of the motor 15 is connected across the armature 171 of a dynamo 17. The armature 171 of the dynamo 17 is rotated at a constant speed by means of a prime mover not shown. Thus, the so-called Ward-Leonard system is built up. The shunt winding 172 of the dynamo 17 is energized by thyristor converters 18 and 19. Shown at 20 is an A.C. power source for the thyristor converters 18 and 19.

A speed command signal 2 for the elevator is produced by a speed pattern generator 21, and flows into the first control winding 41 of a magnetic amplifier type pulse phase shifter 40. The traveling speed of the elevator is proportional to the rotational speed 3 of the motor 15, the latter speed being detected by a speed dynamo 22. The output of the speed dynamo 22 passes through a resistance 23 and causes a speed feedback signal 9 to flow through the second control winding 42 of the phase shifter 40. Via a damping circuit 8, a damping signal 10 which is a differentiated component of the speed 3 also flows through the control winding 42. The damping circuit 8 is a differentiation circuit which consists of a capacitor 81 and a resistor 82.

Further, as previously stated, the damping can also be applied with a fluctuating element which is associated with the speed 3 being the controlled variable. In this embodiment, a current flowing through the motor armature 151 is derived in the form of a voltage across a resistor 24, the voltage is differentiated by a damping circuit 25, and the resultant component is caused to flow through the third control winding 43 of the phase shifter 40. The damping circuit 25 is a differentiation circuit which consists of a capacitor 251 and a resistor 252.

With such construction, the elevator car 11 travels following up the speed command signal 2. When the speed command signal 2 becomes zero, the elevator car 11 stops. In order to hold the elevator moving system stopped, a magnet brake 26 is provided.

The magnetic amplifier type pulse phase shifter 40 is a magnetic amplifier comprising a saturable core (not shown), the control windings 41, 42 and 43 which are wound round the core, and two sets of output windings (also called "A.C. windings") which are connected between an A.C. power source and a load through rectifier elements and which are wound round the core. As the aforecited load the gate—cathode circuit of the thyristor is connected. As is well known, the magnetic amplifier exploits the fact that the saturating point of time of a core in each half cycle of an A.C. power source varies in response to a control input and the fact that the impedance of an output winding is abruptly lowered by the saturation of the core, and it generates an output voltage during a period from the saturating point of time of the core to the end of the particular half cycle. Accordingly, when the gate—cathode circuit of the thyristor is connected as the load, the phase control of the thyristor can be done in response to the control input. Such device is termed the "magnetic amplifier type pulse phase shifter."

The magnetic amplifier type pulse phase shifter 40 has the function of the comparator 4 in FIG. 3. That is, it generates an output voltage which is phase-controlled in response to the summation of magnetomotive forces given by the control windings 41, 42 and 43.

A magnetic amplifier 60 is endowed with the function of a Schmitt circuit (as will be described later) besides the function of the comparator 6 in FIG. 3. The magnetic amplifier 60 is equipped with first, second and third control windings 61, 62 and 63 respectively. These control windings are connected in series with the control windings 41, 42 and 43 of the magnetic amplifier type phase shifter 40, and the same currents are caused to flow, respectively. Accordingly, when the turn ratio among the control windings 41, 42 and 43 is the same as the turn ratio among the control windings 61, 62 and 63, the summation of control magnetomotive forces given to the magnetic amplifier 60 is substantially zero while the control system is normal. Upon occurrence of any fault in the control system, the absolute value of the summation of the control magnetomotive forces becomes great abruptly, and the magnetic amplifier 60 can operate a fault detector 7. The fault detector 7 can be constructed of an electromagnetic relay.

Upon the operation of the fault detector 7, the speed pattern generator 21 is interrupted, and emergency braking can be applied to the elevator by the magnet brake 26.

As is well known, in a control system which forms a closed loop, when a feedback line is disconnected, there is the danger that an excessive input will be applied to a control unit and that a controlled variable (for example, speed) will increase abruptly. Such a fault must be detected as quickly as possible. If the comparators 4 and 6 in FIG. 3 are of the voltage comparing type, the disconnection at a point a or b cannot be quickly detected. More specifically, the comparator 4 bestows an excessive input on the control unit 1 due to the extinction of the feedback signal 9 or the damping signal 10, and the output 3 increases instantly. On the other hand, the comparator 6 is supplied with both the feedback signal 9 and the damping signal 10 and cannot instantly operate the detector 7. The fault is sensed for the first time when, due to the increase of the output 3, the output of the comparator 6 has increased up to a level high enough to operate the fault detector 7. Such sensing of the fault as the result of the output 3 cannot guarantee the safety of the machine in some cases.

In FIG. 4, the respectively corresponding control windings 41 and 61, 42 and 62, and 43 and 63 of the first and second comparator means 40 and 60 are connected in series with each other. In contrast to the above, therefore, whatever part of the feedback circuit the disconnection occurs at, the fault detector 7 can be instantly operated.

Figure 5:
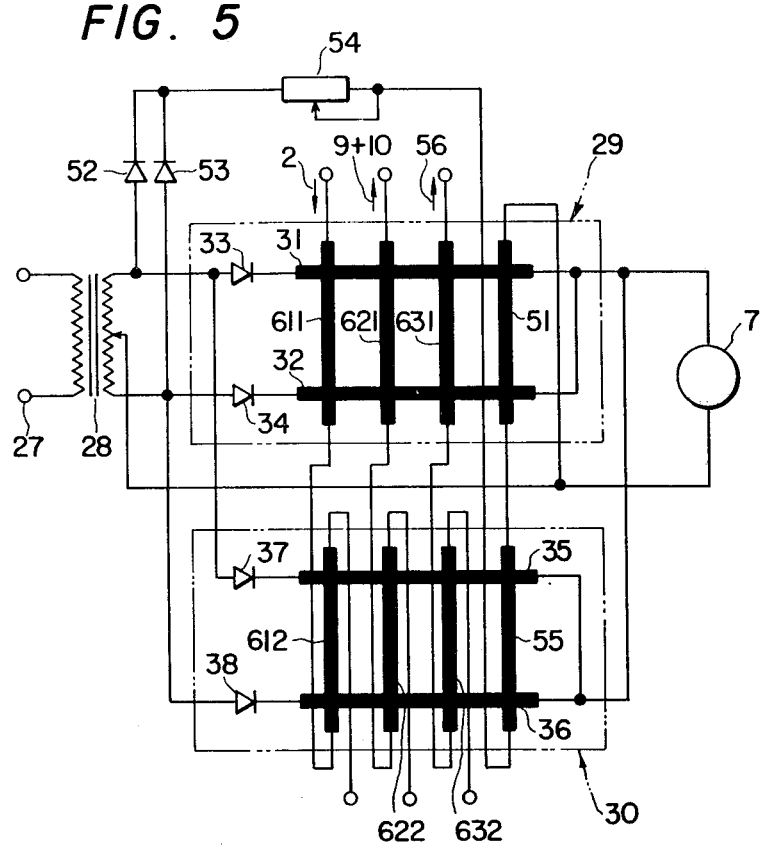
FIG. 5 is a detailed electric circuit diagram of a fault detecting portion.

FIG. 5 is a detailed electric circuit diagram of the fault detector 7 as well as the magnetic amplifier 60 which builds up the second comparator means. Two sets of magnetic amplifiers 29 and 30 are provided, a common power supply of which consists of an A.C. power source 29 and a transformer 28. The magnetic amplifier 29 has control windings 611, 621 and 631, into which the command signal, the feedback signal and the damping signal explained with reference to FIG. 4 are entered. Voltages subjected to the half-wave rectification by diodes 33 and 34 are applied to output windings 31 and 32 through the fault detector 7, respectively. A bias winding 51 is provided, to which a voltage subjected to the full-wave rectification by diodes 52 and 53 is applied through a resistor 54.

Also the other magnetic amplifier 30 is equipped with control windings 612, 622 and 632, output windings 35 and 36, diodes 37 and 38, and a bias winding 55. It is constructed similarly to the magnetic amplifier 29. The two sets of magnetic amplifiers 29 and 30, however, are connected so that the directions of currents flowing through the control windings may become opposite to each other. Consequently, when a deviation signal obtained by subtracting the feedback signal 9 and the damping signals 10 and 56 from the speed command signal 2 has exceeded a positive predetermined value, the magnetic amplifier 29 provides an output voltage, whereas when the deviation signal has exceeded a negative predetermined value, the magnetic amplifier 30 provides an output voltage. The predetermined values can be arbitrarily set in such a way that bias currents to flow through the bias windings 51 and 55 are varied by the adjustment of the resistor 54.

Figure 6:
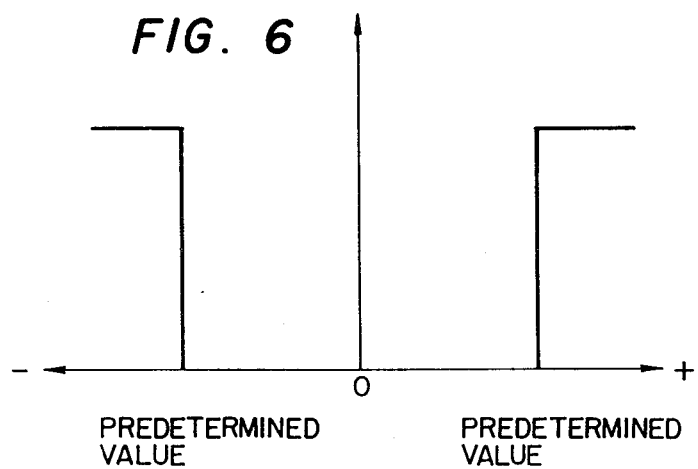
FIG. 6 is an output characteristic diagram of the fault detecting portion.

FIG. 6 shows output voltage characteristics which are produced by the second comparator means illustrated in FIG. 5. When the deviation signal has exceeded the positive or negative predetermined value, the output voltage can be provided.

Figure 7:
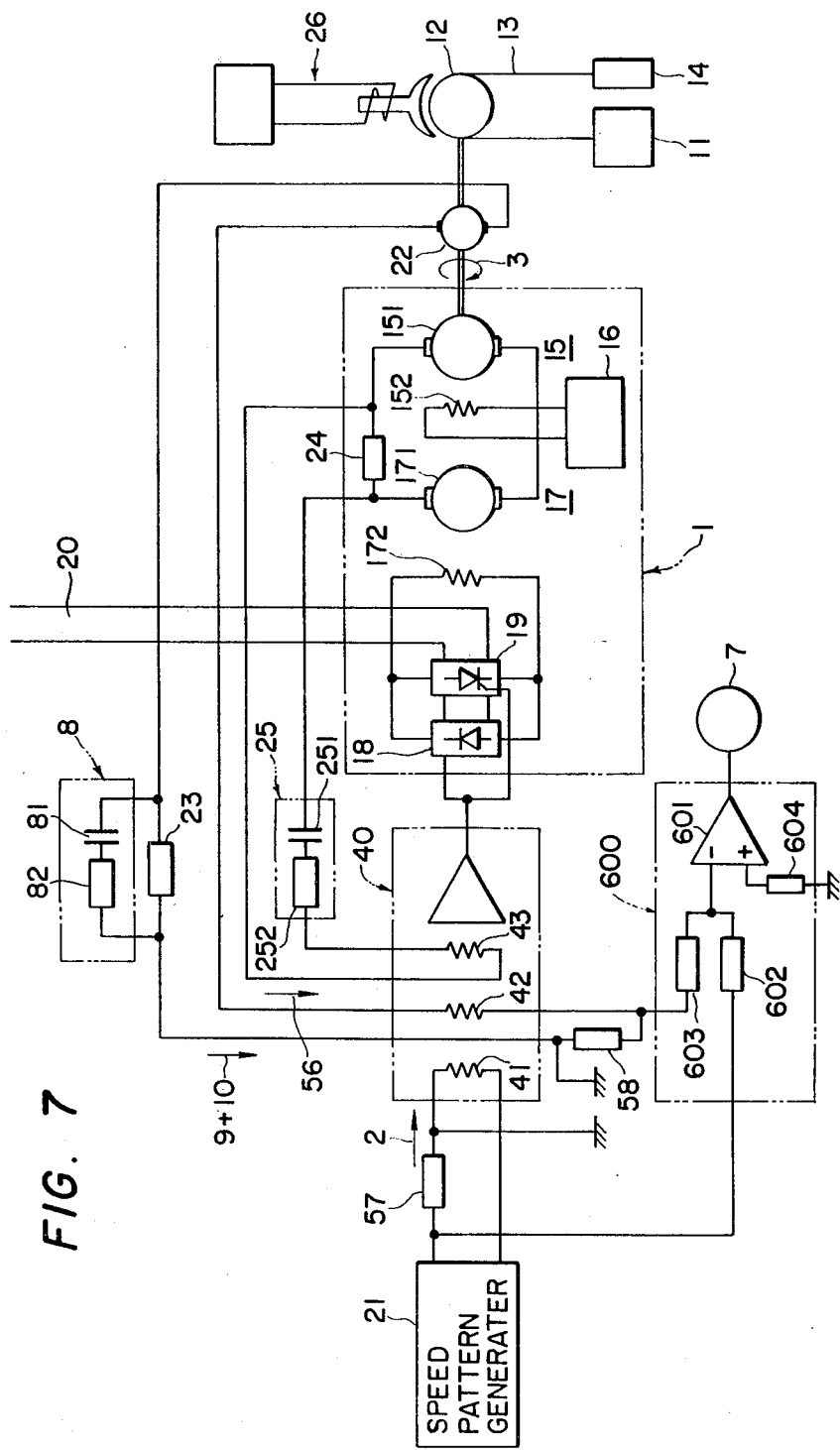
FIG. 7 is an electric circuit diagram of another embodiment of this invention.

FIG. 7 shows another embodiment of this invention, and illustrates a modification of the second comparator means. As the second comparator means, there is comprised a comparator 600 of the voltage comparing type employing an operational amplifier. Numeral 601 designates the operational amplifier, numerals 602 and 603 input resistors, and numeral 604 a grounding resistor. A resistor 57 is incorporated in the current path of the command signal 2, and one terminal thereof is grounded. The other terminal of the resistor 57 is connected to the input resistor 602 of the comparator 600. A resistor 58 is incorporated in the current path of the feedback signal 9 and the damping signal 10, and one terminal thereof is grounded. The other terminal of the resistor 58 is connected to the input resistor 603 of the comparator 600.

With such a construction, voltages which are proportional to the current signals 2 and (9+10) entered into the magnetic amplifier type pulse phase shifter 40 serving as the first comparator means are put into the comparator 600. Accordingly, even a case of employing the comparator of the voltage comparing type, a fault detecting system which operates in response to the disconnection of any part in a moment can be provided by entering into the comparator the voltages which are proportional to the electric quantities entered into the first comparator means.

In the case where a plurality of dampings are applied as described previously, all the damping signals need not be entered into the second comparator means. In the embodiment of FIG. 7, therefore, the current damping signal 56 is not transmitted to the second comparator means 600.

We claim:

1. A fault detecting system for control apparatus, comprising: a control unit; means for generating a command signal representative of a desired value of a controlled variable which is to be obtained by said control unit; means for deriving a feedback signal representative of an actual value of the controlled variable which is obtained as an output of said control unit; means for deriving a damping signal representative of a variation in an arbitrary fluctuating element which is associated with said controlled variable; first and second comparator means for comparing said command signal with a sum of said feedback signal and said damping signal; means for entering an output of said first comparator means into said control unit; and fault detecting means coupled to an output of said second comparator to detect when an absolute value of the output of said second comparator means exceeds a predetermined value.

2. A fault detecting system for control apparatus according to claim 1, wherein said means for deriving a damping signal comprises means for detecting an actual value of the fluctuating element, and means for differentiating the output of the detecting means.

3. A fault detecting system for control apparatus according to claim 1, wherein said controlled variable is a speed.

4. A fault detecting system for control apparatus according to claim 3, wherein said arbitrary fluctuating element includes a speed.

5. A fault detecting system for control apparatus according to claim 3, wherein said control unit includes a motor for driving a load.

6. A fault detecting system for control apparatus according to claim 5, wherein said arbitrary fluctuating element includes a speed.

7. A fault detecting system for control apparatus according to claim 5, wherein said arbitrary fluctuating element includes a current flowing through said motor.

8. A fault detecting system for control apparatus according to claim 4, wherein said means for deriving a damping signal comprises a speed dynamo for detecting an actual value of the speed, and means for differentiating the output voltage of said speed dynamo.

9. A fault detecting system for control apparatus according to claim 8, wherein the differentiating means comprises a capacitor and a resistor which are connected in series.

10. A fault detecting system for control apparatus according to claim 7, wherein said means for deriving a damping signal comprises means for deriving a voltage proportional to said current, and means for differentiating this output voltage.

11. A fault detecting system for control apparatus according to claim 10, wherein the differentiating means comprises a capacitor and a resistor which are connected in series.

12. A fault detecting system for control apparatus according to claim 5, wherein said motor is a D.C. motor, and wherein said control unit comprises means for exciting a field winding of said motor in a predetermined manner, and means for adjusting a voltage to be applied to said motor, in response to said output of said first comparator means.

13. A fault detecting system for control apparatus according to claim 12, wherein the voltage adjusting means comprises a D.C. dynamo having an armature which lies in a Ward-Leonard connection with an armature of said motor and which is rotated by a prime mover, and a field winding which is excited in response to said output of said first comparator means.

14. A fault detecting system for control apparatus according to claim 1, wherein said first comparator means is constructed of a magnetic amplifier having a saturable core, at least two control windings which are provided on said core so as to be energized by said command signal, said feedback signal and said damping signal, and an output winding which is wound around said core and which is fed with electricity by an A.C. power source.

15. A fault detecting system for control apparatus according to claim 14, wherein said control unit includes a thyristor which is phase-controlled by a voltage appearing in said output winding of said magnetic amplifier.

16. A fault detecting system for control apparatus according to claim 1, wherein said second comparator means is constructed of a magnetic amplifier having a saturable core, at least two control windings which are provided on said core so as to be energized by said command signal, said feedback signal and said damping signal, and an output winding which is wound around said core and which is fed with electricity by an A.C. power source.

17. A fault detecting system for control apparatus according to claim 16, wherein said second comparator means comprises two sets of magnetic amplifiers, a first one of which provides an output when a deviation signal obtained by subtracting said feedback signal and said damping signal from said command signal has exceeded a positive predetermined value and a second one of which provides an output when said deviation signal has exceeded a negative predetermined value.

18. A fault detecting system for control apparatus according to claim 1, wherein said first and second comparator means are constructed so as to compare the respective entered signals in the form of electric quantities, and said second comparator means is constructed so as to receive electric quantities proportional to current quantities entered into said first comparator means.

19. A fault detecting system for control apparatus according to claim 18, wherein said first and second comparator means are respectively constructed of first and second magnetic amplifiers each having a saturable core, at least two control windings which are provided on said core so as to be energized by said command signal, said feedback signal and said damping signal, and an output winding which is wound around said core and which is fed with electricity by an A.C. power source, and wherein the corresponding control windings of said first and second magnetic amplifiers are connected in series.

20. A fault detecting system for control apparatus according to claim 5, wherein said load comprises a sheeve, and an elevator car and a counterweight which are suspended from said sheeve through a rope in a well bucket fashion.

21. A fault detecting system for control apparatus according to claim 1, wherein said second comparator comprises an operational amplifier.

22. A fault detecting system for control apparatus according to claim 21, wherein one input terminal of said operational amplifier receives the sum of said command signal, said feedback signal and said damping signal, and another input terminal of said operational amplifier receives a reference signal.

23. A fault detecting system for control apparatus according to claim 22, wherein said reference signal is a ground signal.

24. A fault detecting system for control apparatus according to claim 14, wherein said second comparator comprises an operational amplifier.

25. A fault detecting system for control apparatus according to claim 24, wherein one input terminal of said operational amplifier receives the sum of said command signal, said feedback signal and said damping signal, and another input terminal of said operational amplifier receives a reference signal.

26. A fault detecting system for control apparatus according to claim 25, wherein said reference signal is a ground signal.

* * * * *